(12) United States Patent
Winkler et al.

(10) Patent No.: US 9,529,333 B2
(45) Date of Patent: Dec. 27, 2016

(54) METHOD OF MANUFACTURING A DEVICE COMPRISING AT LEAST TWO PARTS

(75) Inventors: Yves Winkler, Scmitten (CH); Stewes Bourban, Cudrefin (CH); Alban Dubach, Bienne (CH)

(73) Assignee: The Swatch Group Research and Development Ltd., Marin (CH)

( * ) Notice: Subject to any disclaimer, the term of this patent is extended or adjusted under 35 U.S.C. 154(b) by 933 days.

(21) Appl. No.: 13/701,970

(22) PCT Filed: Jun. 22, 2011

(86) PCT No.: PCT/EP2011/060510
§ 371 (c)(1),
(2), (4) Date: Mar. 19, 2013

(87) PCT Pub. No.: WO2011/161192
PCT Pub. Date: Dec. 29, 2011

(65) Prior Publication Data
US 2013/0167981 A1     Jul. 4, 2013

(30) Foreign Application Priority Data

Jun. 22, 2010   (CH) ..................................... 1020/10
Jun. 22, 2010   (CH) ..................................... 1022/10

(51) Int. Cl.
*G04D 3/00*       (2006.01)
*G04B 13/02*      (2006.01)
(Continued)

(52) U.S. Cl.
CPC ............ *G04D 3/0074* (2013.01); *B21D 39/00* (2013.01); *B23P 6/00* (2013.01); *G04B 13/022* (2013.01); *G04B 15/14* (2013.01); *G04D 3/00* (2013.01)

(58) Field of Classification Search
CPC .......... G04D 3/0074; G04D 3/00; B21D 39/00
See application file for complete search history.

(56) References Cited

U.S. PATENT DOCUMENTS 4,373,974 A  *  2/1983  Barajas ................ B23K 35/262
                                                          148/24
2007/0237035 A1* 10/2007 Helfer ................... F16D 41/069
                                                          368/147
(Continued)

FOREIGN PATENT DOCUMENTS

| EP | 2 138 323 | 12/2009 |
| EP | 2 180 385 | 4/2010 |
| EP | 2 317 406 | 5/2011 |

OTHER PUBLICATIONS

U.S. Appl. No. 13/701,971, filed Dec. 4, 2012, Winkler, et al.
(Continued)

*Primary Examiner* — Veronica F Faison
(74) *Attorney, Agent, or Firm* — Oblon, McClelland, Maier & Neustadt, L.L.P.

(57) ABSTRACT

A method of assembling a device including first and second parts, the method including: taking the first and second parts; assembling the first and second parts provided by their arrangement so a gap is present between the first and second parts; taking a metal alloy, chosen for its ability to become at least partially amorphous; shaping the metal alloy to fill the gap between the first and second parts to join them and thereby form the device, the metal alloy having been subject to a treatment allowing the alloy to become at least partially amorphous, at a latest at a time of the shaping. The metal alloy is subject to a temperature increase above the melting temperature thereof causing the alloy to lose any local crystalline structure, the increase followed by cooling to a (Continued)

lower temperature than vitreous transition temperature thereof allowing the material to become at least partially amorphous.

29 Claims, 6 Drawing Sheets

(51) Int. Cl.
*G04B 15/14* (2006.01)
*B23P 6/00* (2006.01)
*B21D 39/00* (2006.01)

(56) References Cited

U.S. PATENT DOCUMENTS

| | | |
|---|---|---|
| 2009/0196125 A1 | 8/2009 | Tsuchiya et al. |
| 2011/0051573 A1 | 3/2011 | Tsuchiya et al. |
| 2011/0103199 A1 | 5/2011 | Winkler et al. |
| 2011/0103200 A1 | 5/2011 | Cusin |
| 2012/0024432 A1* | 2/2012 | Bazin ............ B21J 1/006 148/522 |
| 2012/0155231 A1* | 6/2012 | Conus ............ G04B 31/04 368/324 |

OTHER PUBLICATIONS

U.S. Appl. No. 13/703,519, filed Dec. 11, 2012, Winkler, et al.
International Search Report Issued Nov. 24, 2011 in PCT/EP11/060510 Filed Jun. 22, 2011.

* cited by examiner

METHOD OF MANUFACTURING A DEVICE COMPRISING AT LEAST TWO PARTS

CROSS-REFERENCE TO PRIORITY APPLICATIONS

This is a National Phase Application in the United States of International Patent Application PCT/EP2011/060510 filed Jun. 22, 2011, which claims priority on Swiss Patent Application No. 01020/10 of Jun. 22, 2010 and Swiss Patent Application No. 01022/10 of Jun. 22, 2010. The entire disclosures of the above patent applications are hereby incorporated by reference.

The present invention concerns a method of assembling a device comprising a first part and at least a second part, said first part and said at least one second part being arranged to allow assembly to each other.

The technical field of the invention is the field of fine mechanics.

BACKGROUND OF THE INVENTION

There exist numerous devices which require a high precision manufacturing method, such as, for example, in micro technical fields like horology. Indeed, the world of horology works with dimensions that range from a millimeter to a tenth of a millimeter. Gear trains or escapements are among the examples of devices where precision is important. The escapement is formed of a pallet lever and an escape wheel cooperating with each other, the rotation of the escape wheel being regulated by the pallet lever of the escape system whose impulses are supplied by a sprung balance. The impulses are therefore important. These impulses are achieved by pallet stones which are inserted in the pallet lever and come into contact with the escape wheel. If the pallet stones of the lever are not properly positioned, the impulses between the pallet stones of the lever and the escape wheel are not perfect and losses occur which affect the efficiency of the escapement and therefore the accuracy and autonomy of the watch.

Currently, pallet stones are assembled on a pallet lever using shellac, which is a natural product with the properties of thermoplastics. Viscosity is difficult to control with this type of material and it is difficult to control the volume of adhesive deposited. It therefore often happens that the shellac overflows which causes aesthetic defects which may be unacceptable. Further, the shellac is an organic material which is subject to ageing and consequently the pallet stone setting may be weakened over time.

Another possibility is to use brazing or welding. However, these two solutions are also problematic since, to successfully weld a ceramic or silicon or mineral material, reactive brazing/welding has to be used, which must be performed at a relatively high temperature (generally above 700° C.) and in a neutral or high vacuum atmosphere. This results in very long assembly cycles and breaks and cracks may appear in the material.

There also exist devices which require not only a high level of precision, but also a manufacturing method which is gentle on the component parts. Silicon, which is an increasingly used material, particularly in horology, can be cited here in particular. This material, which has no usable plastic range, is used to make gear wheels or escape system pallet levers, but has the drawback of being very fragile. Currently, no method other than bonding exists for securing a silicon wheel to an arbour. Bonding has the drawbacks of being difficult to reproduce, of generating organic compounds which may degrade the oils used and of weakening over time.

SUMMARY OF THE INVENTION

It is an object of the invention to overcome the drawbacks of the prior art by proposing to provide a simple, precise manufacturing method for securing parts made of material with no usable plastic range without any risks.

The invention therefore relates to the aforementioned manufacturing method which is characterized in that said method further includes the following steps:
 taking the first part and the at least one second part,
 assembling said at least one second part and said first part as provided by their arrangement so that a gap is present between said at least one second part and said first part,
 taking a metal alloy capable of becoming at least partially amorphous;
 shaping said metal alloy so that it fills the gap between said at least one second part and said first part so as to join them and thereby form said device, said material having been subject to a treatment allowing it to become at least partially amorphous, at the latest at the time of said shaping operation.

A first advantage of the present invention is that it allows pallet stones to be simply assembled to the pallet lever. Indeed, the amorphous metal allows simple and inexpensive methods to be used for shaping, such as hot forming or casting, which do not require complex expensive tools.

Another advantage is that the present invention provides an efficient fixing means. Indeed, amorphous metals have the ability to soften a great deal when they are heated to a temperature comprised between their vitreous transition temperature and their crystallisation temperature. Within this temperature range, the viscosity of amorphous metals decreases sharply and the decrease in viscosity is temperature dependent: the higher the temperature, the more the viscosity decreases. This viscosity allows the amorphous metal to be inserted into every corner of a mould and thus improves attachment while at the same time providing a precise part.

Another advantage of this method is that it allows subsequent adjustment. Indeed, the fact that the joint is made of amorphous metal means that subsequent adjustment is possible by taking advantage of the shaping properties of amorphous metal. Since this metal can soften when it is heated to a temperature comprised between its vitreous transition temperature Tg and its crystallisation temperature Tx, the position of the pallet stones can be modified without breaking the assembly of the pallet stones and pallet lever.

Advantageous embodiments of this method form the subject of the dependent claims.

In a first advantageous embodiment, said metal alloy is subject to a temperature increase above its melting temperature causing it to lose any local crystalline structure. Said increase is then followed by cooling to a lower temperature than the vitreous transition temperature allowing said material to become at least partially amorphous.

In a second advantageous embodiment, the shaping step consists in shaping said metal alloy only after having previously transformed it into an at least partially amorphous preform. Said preform is then subject to a temperature comprised between the vitreous transition temperature and the crystallisation temperature of the material and then to a pressure forming operation, followed by a cooling operation allowing said material to preserve an at least partially amorphous nature.

In a third advantageous embodiment, the shaping step is simultaneous with a treatment which makes said first material at least partially amorphous, by subjecting it to a temperature higher than its melting temperature, followed by cooling to a temperature lower than its vitreous transition temperature, which allows said material to become at least partially amorphous, during a casting operation.

The invention therefore concerns the method of assembling a device comprising a first part and at least one second part, wherein said first part and said at least one second part are arranged to allow assembly to each other. Said method is characterized in that said method further includes the following steps:
- taking the first part and the at least one second part,
- taking a metal alloy, chosen for its ability to become at least partially amorphous;
- transforming said metal alloy so as to obtain an at least partially amorphous preform;
- placing said preform on said first part;
- heating said preform to a temperature comprised between the vitreous transition temperature and the crystallisation temperature of the material;
- assembling said at least one second part and said first part so that said at least one second part exerts pressure on the preform so that said preform fills the gap created between said at least one second part and said first part during said assembling step, and so that said at least one second part and said first part are joined to each other thereby forming said device.

In a first advantageous embodiment, the method further includes a step of crystallising said metal alloy, consisting in heating said material to a temperature comprised between its vitreous transition temperature and its melting temperature, followed by cooling to make said material at least partially crystalline.

In a second advantageous embodiment, the first part and/or second part are made of a material which has no usable plastic range.

In a third advantageous embodiment, said metal alloy is totally amorphous.

In a fourth advantageous embodiment, said metal alloy includes at least one precious metal element and is selected from the group comprising gold, platinum, palladium, rhenium, ruthenium, rhodium, silver, iridium or osmium.

In another advantageous embodiment, said first part or said at least one second part includes portions in relief so as to improve the attachment between said first part and said at least one second part.

In another advantageous embodiment, said first part and said at least one second part includes portions in relief so as to improve the attachment between said first part and said at least one second part.

In another advantageous embodiment, said first part is a pallet lever and said at least one second part is a pallet stone.

In another advantageous embodiment, said first part is a wheel and said at least one second part is an arbour.

In another advantageous embodiment, the wheel is made of silicon.

In another advantageous embodiment, the wheel is made of ceramic material.

In another advantageous embodiment, the wheel is made of a ceramic-metal (cermet) composite.

BRIEF DESCRIPTION OF THE DRAWINGS

The objects, advantages and features of the method according to the present invention will appear more clearly in the following detailed description of at least one embodiment of the invention, given solely by way of non-limiting example and illustrated by the annexed drawings, in which.

DETAILED DESCRIPTION OF THE INVENTION

Figure 1:
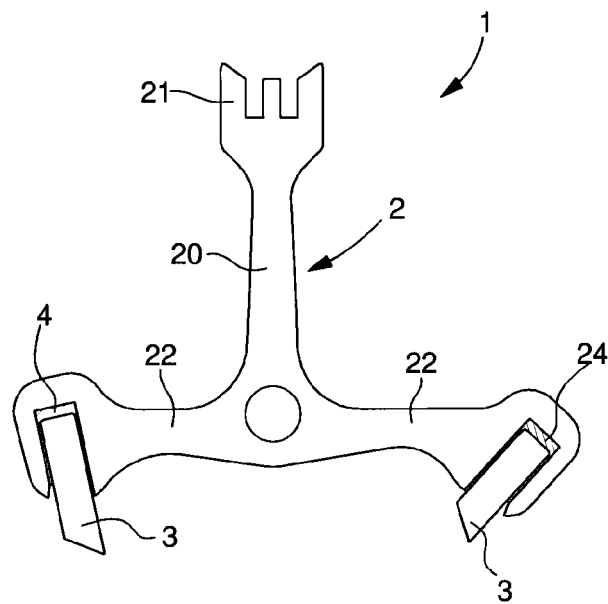
FIG. 1 shows schematically the device 1 using the method according to the present invention.

FIG. 1 shows a device 1 comprising a first part 2 and at least a second part 3. This device 1 may, for example, be parts of a timepiece escape system. This escape system is formed of a pallet lever 2 and an escape wheel cooperating with each other. The rotation of the escape wheel is regulated by the pallet lever 2 of the escape system whose impulses are provided by a sprung balance. Pallet lever 2 is pivotally mounted on an arbour. This pallet lever 2 forms the first part and takes the form of a fork lever 20 provided with a fork 21, at a first end, intended to cooperate with an impulse pin mounted on a roller and provided with at least two arms 22, at a second end. This pallet lever 2 is intended to receive at least one second part, i.e. pallet stones 3 in order to cooperate with the escape wheel. Pallet lever 2 is made of a first material while pallet stones 3 are made of a second material. During operation, pallet lever 2 pivots on its arbour such that pallet stones 3 enter into contact with the escape wheel teeth so as to regulate the rotation of the gear trains.

Pallet stones 3 are secured to fork lever 20 of pallet lever 2 in housings 23 arranged on each of the two arms 22. The dimensions of these housings 23 are calculated to leave a gap 24 or space between said arm 22 and said pallet stone 3 when said stone is inserted into housing 23. This gap 24 is utilised so that a material forming a joint 4 can be arranged between said arm and said pallet stone.

The assembly of pallet stones 3 to pallet lever 2 via joint 4 is achieved using the method according to the present invention.

Figure 2:
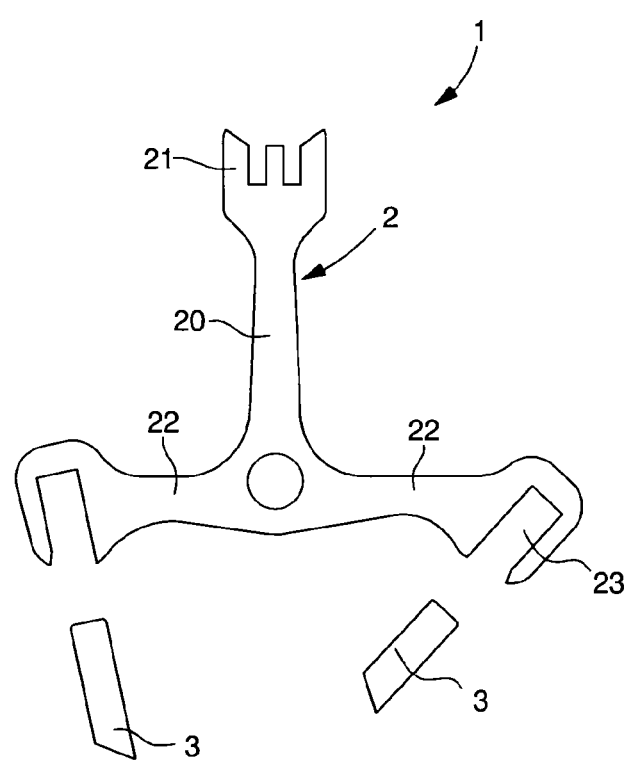
FIGS. 2 to 7 show schematically a first solution of the first embodiment.

In a first embodiment, the manufacturing and assembly method of device 1 comprising pallet lever 2 and pallet stones 3 includes a first step, consisting in taking the first part 2 and the second part 3, i.e. pallet lever 2 and pallet stones 3, as seen in FIG. 2.

Figure 3:
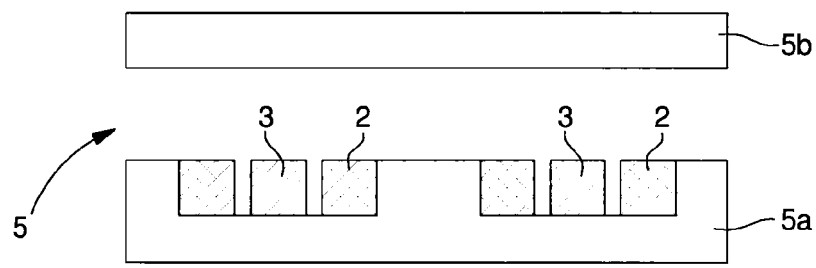

Then a second step consists in placing these first 2 and second 3 parts in a negative form 5, the shape of which matches that of the part to be made. This is illustrated in FIG. 3 which shows a cross-section of the first 2 and second 3 parts placed in negative form 5. These first 2 and second 3 parts are placed in negative form 5, i.e. pallet stones 3 are placed in housings 23 of pallet lever 2 so that a gap 24 is present between each pallet stone 3 and pallet lever 2. Preferably, pallet stones 3 will be positioned in their final position.

Figure 4:
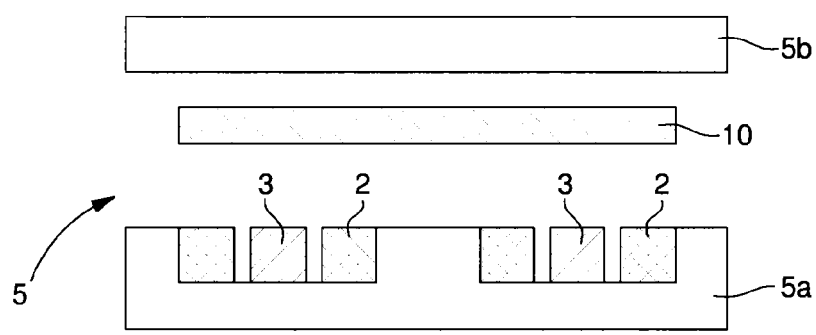
Figure 5:
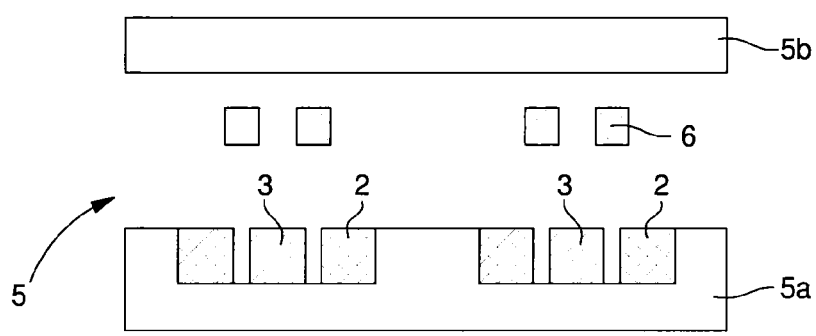
Figure 6:
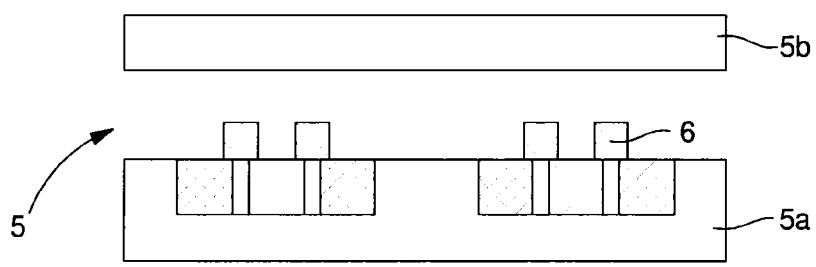
Figure 7:
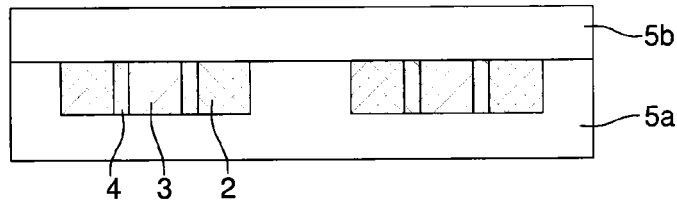
Figure 8:
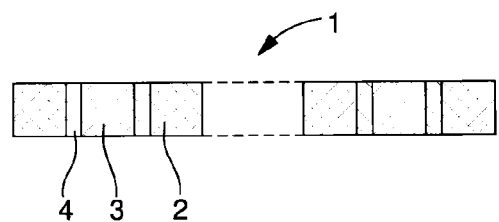
FIGS. 8 to 11 show schematically a second solution of the first embodiment.
Figure 9:
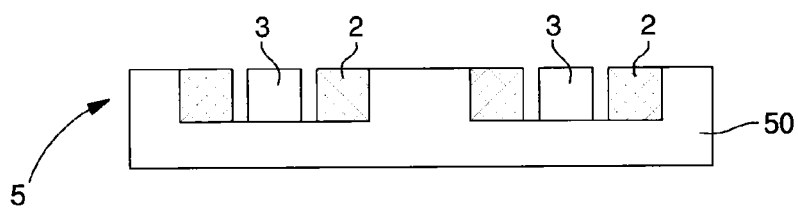
Figure 10:
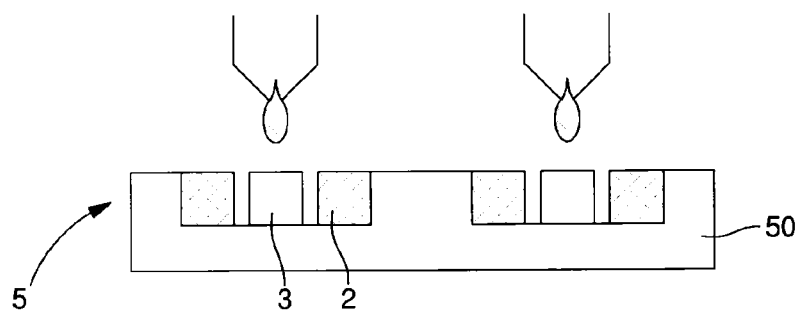
Figure 11:
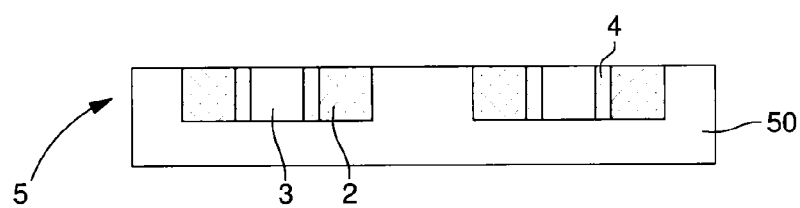
Figure 12:
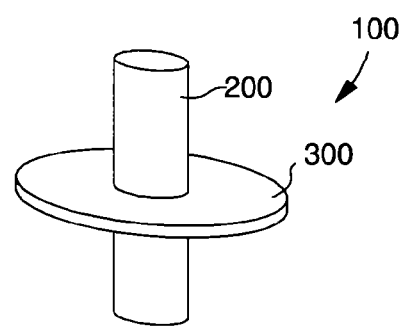
FIGS. 12 to 19 show schematically a second embodiment of the method according to the present invention.
Figure 13:
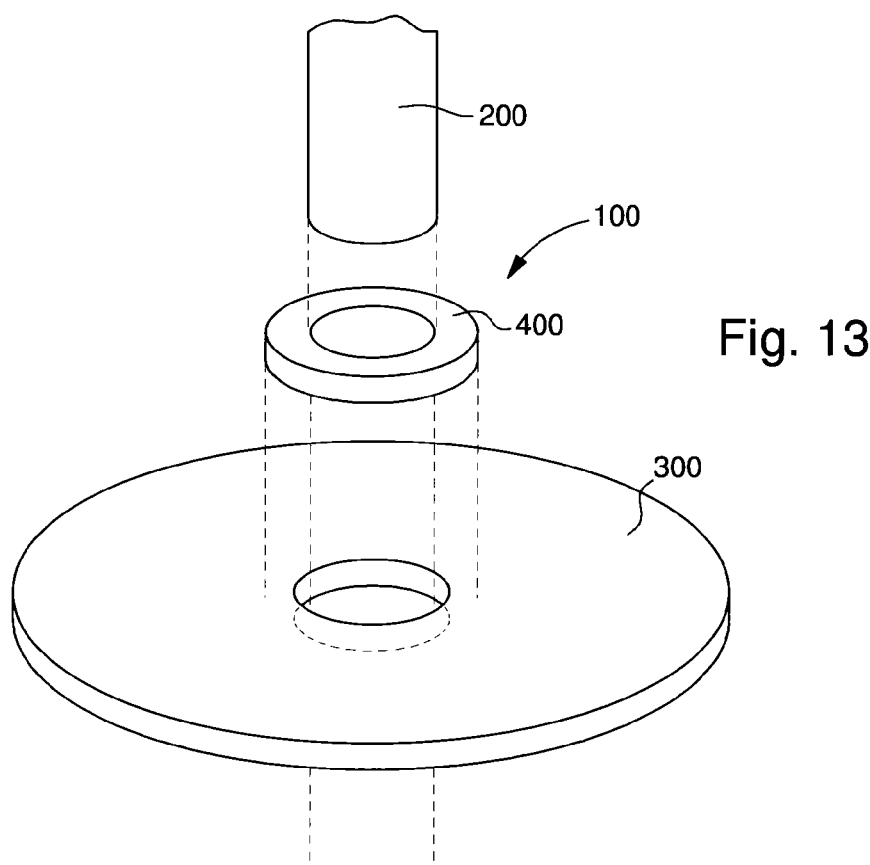

A third step, shown in FIG. 4, consists in taking the material forming joint 4. Joint 4 is made of an at least partially amorphous metal or metal alloy. This material may be called the fixing material. One element of the alloy may be a precious metal element such as gold, platinum, palladium, rhenium, ruthenium, rhodium, silver, iridium or osmium. An "at least partially amorphous material" means that the material is capable of at least partially solidifying in amorphous phase, i.e. it is capable of at least partially avoiding any crystallisation.

In a fourth step, the material is shaped to assemble pallet stones 3 and pallet lever 2.

In a first alternative shown in FIGS. 5 to 8, the material is shaped by hot forming. This method consists first of all of shaping the material so that it takes the form of a preform 6. To achieve this, the material is heated to a temperature equal to or higher than its melting temperature, said material thus becoming liquid. It is then cast into a mould of predefined shape. It is then rapidly cooled so that the atoms forming said material cannot arrange themselves to form a structure. The absence of a structure allows said material to be amorphous. The shape of preform 6 is chosen to be close to the final shape. For example, in the case of pallet lever 2 and pallet stones 3, housings 23 are considered to be substantially parallelepiped. The gaps between pallet stones 3 and pallet lever 2 are thus substantially U-shaped. Hence, the shape of preform 6 is substantially a "U". In the present case, two preforms 6 will be made, one for each pallet stone 3.

Once preforms 6 have been made, they are placed on pallet lever 2 and pallet stones 3, which are placed in negative form 5, in gaps 24. In this alternative, negative form 5 includes two dies 5a and 5b. The whole assembly is then heated to a temperature comprised between the vitreous transition temperature and the crystallisation temperature of the material. During this time period, the viscosity of said material is greatly diminished so that it becomes very easy to handle. A low stress of around 1 MPa can thus be applied to said material, by pressing on dies 5a and 5b, so as to insert the material into the gaps and fill them perfectly. This low stress is advantageous if pallet lever 2 and/or pallet stones 3 are made of fragile materials, i.e. in a material with no usable plastic range. Indeed, in this case, the stress is sufficiently low to prevent pallet lever 2 and/or pallet stones 3 breaking.

Once the amorphous metal is in gaps 24, the assembly is cooled. Cooling is performed rapidly so that the atoms do not have time to structure themselves which allows the material to remain in amorphous form. Indeed, for a given material at a given temperature between its vitreous transition temperature Tg and its crystallisation temperature Tx, there is a maximum duration beyond which said material crystallises. This duration decreases when the temperature gets close to its crystallisation temperature Tx and the duration increases when the temperature gets close to its vitreous transition temperature Tg. Thus, the amorphous material will crystallise if the time spent at a temperature comprised between Tg and Tx exceeds a certain specific value for each temperature/alloy pair. Typically for the Zr41.2Ti13.8Cu12.5Ni10Be22.5 alloy and a temperature of 440° C., the pressing time should not exceed around 120 seconds. Thus, hot working preserves the at least partially amorphous initial state of the preform.

A second alternative shown in FIGS. 9 to 13 consists in using casting to fill gaps 24 with material. To achieve this, the pre-shaped material is heated to a temperature equal to or higher than its melting temperature, said material therefore becoming liquid. It is then, for example, cast into negative form 5 comprising a mould 50 in which pallet lever 2 and pallet stones 3 are placed. It is then rapidly cooled so that the atoms forming said material cannot arrange themselves to form a structure. The absence of a structure allows said material to be amorphous. Any surplus material can be removed by various techniques such as abrasion.

The advantage of casting an amorphous metal is that it achieves greater precision and greater resistance for the cast moulded object. Indeed, once cast, amorphous metals have the advantage of having a solidification shrinkage of less than 1%, whereas equivalent crystalline castings have a solidification shrinkage of 5% to 7%. This means that the amorphous material will keep the shape and dimensions of the place into which it is cast, whereas a crystalline material will contract. This is advantageous since the joint does not require any stress and consequently there is no risk of breaking the first part or the second part. Moreover, the very low solidification shrinkage of the casting means that joint 4 is not deformed during cooling. Joint 4 is thus not weakened and does not adversely affect the longevity of device 1.

Of course, this first embodiment is not limited to the assembly of the pallet stones of a pallet lever and may thus also be used to assemble a wheel to an arbour.

In a second embodiment of the manufacturing and assembly method, the device 1 used as an example has an arbour 300 and a wheel 200 which have to be assembled to each other. The manufacturing and assembly method includes a first step shown in FIGS. 12 and 13 which consists in taking first part 2 and second part 3, i.e. respectively arbour 200 and wheel 300 here. This wheel 300 may be made of silicon, ceramic material or a ceramic-metal composite (cermet).

Figure 14:
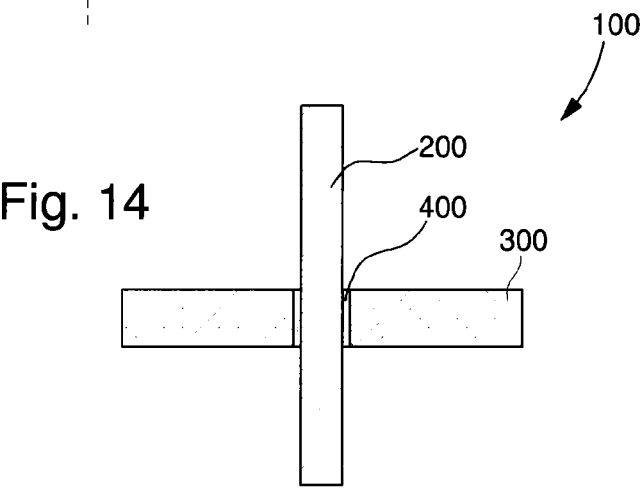

A second step shown in FIG. 14 consists in taking the material forming joint 400. Joint 400 is thus made of an at least partially amorphous metal alloy. To achieve this, the metal alloy forming joint 4 is made by mixing the different metals that it contains. Then, said alloy is melted for casting into a negative form 5 in the form of a mould 50 of the desired shape. A cooling step is then performed so that said melted alloy solidifies. This solidification is controlled so that the alloy takes an amorphous state. In this case, the preform is an annular preform. The alloy may include a precious metal element such as gold, platinum, palladium, rhenium, ruthenium, rhodium, silver, iridium or osmium. An "at least partially amorphous material" means that the material is capable of at least partially solidifying in amorphous phase, i.e. it is capable of at least partially avoiding any crystallisation. This preform 600 is then sized so that the internal diameter thereof is smaller than the internal diameter of wheel 300 and the external diameter thereof is comprised between the internal diameter and external diameter of wheel 300. Moreover, the internal diameter of the preform is also smaller than the diameter of arbour 200, the latter being smaller than the internal diameter of wheel 300.

Figure 15:
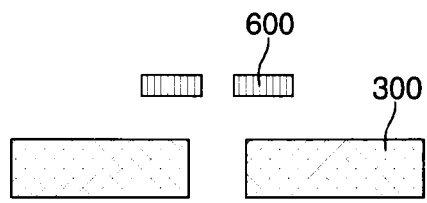

A third step shown in FIG. 15 consists in placing preform 600 on wheel 300. This preform 600 is placed in areas where the assembly between wheel 300 and arbour 200 must occur.

Figure 16:
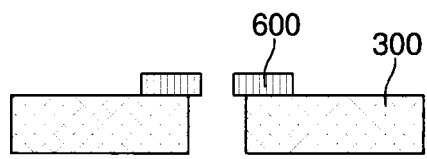

A fourth step shown in FIG. 16 consists in heating the assembly to a temperature comprised between the vitreous transition temperature and the crystallisation temperature of the material. During this time period, the viscosity of said material is thus greatly diminished so that it becomes easy to deform to facilitate the shaping thereof.

Figure 17:
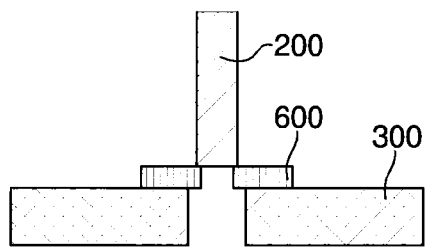
Figure 18:
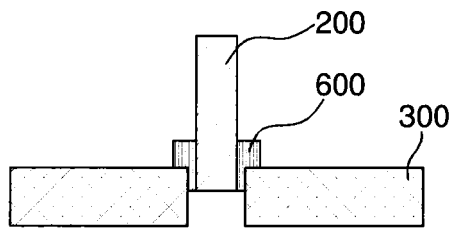

In a fifth step shown in FIGS. 17 and 18, arbour 200 is assembled to wheel 300. To achieve this, pressure is exerted on arbour 200 to assemble it to wheel 300. This assembly requires said pressure to be applied to amorphous metal preform 600. Indeed, since the internal diameter of preform 600 is smaller than the internal diameter of wheel 300, the fact that arbour 200 is inserted into the diameter of wheel 300 causes a contact between said arbour 200 and preform 600. The latter then undergoes deformation due to the viscous state of said amorphous metal. This deformation allows said amorphous metal to be inserted between wheel 300 and arbour 200 due to the adherence of the viscous amorphous metal to arbour 200. An amorphous metal joint is therefore obtained, filling the gap between wheel 300 and arbour 200 so that a hold is created between wheel 300 and arbour 200.

Figure 19:
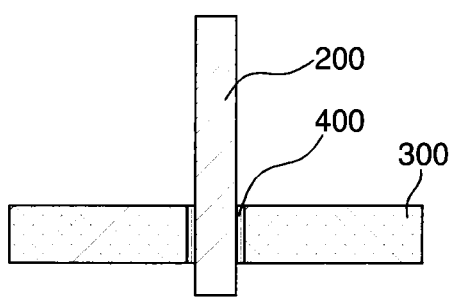

Once the amorphous metal has filled the gap between wheel 300 and arbour 200, the assembly is cooled. Cooling is performed rapidly so that the atoms do not have time to structure themselves which allows the material to remain in amorphous form. This solidifies the amorphous metal and therefore sets the join between wheel 300 and arbour 200. The device 100 shown in FIG. 19 is thus obtained.

In a first variant, an additional step is provided which is respectively the fifth step in the case of the first embodiment or the sixth step in the case of the second embodiment. During this step, amorphous metal joints 4, 400 are crystallised. The crystallisation is achieved by raising their temperature to a temperature comprised between the vitreous transition temperature Tg and the melting temperature of the material forming the joints, then cooling said material forming joints 4, 400. This crystallisation sets the position of the two parts 2, 3, 200, 300 in relation to each other. Indeed, if this crystallisation step is not carried out, it is possible, by heating said joints 4, 400 to a temperature comprised between the vitreous transition temperature Tg and the crystallisation temperature Tx of the material forming said joints 4, 400, to make them viscous again. It is then possible to modify the position of first part 2, 200 and/or second part 3/300 before rapidly cooling of said joints 4, 400 so that the material remains amorphous. It is also possible to let the material forming joints 4, 400 cool slowly in order to set the position after adjustment.

Figure 20:
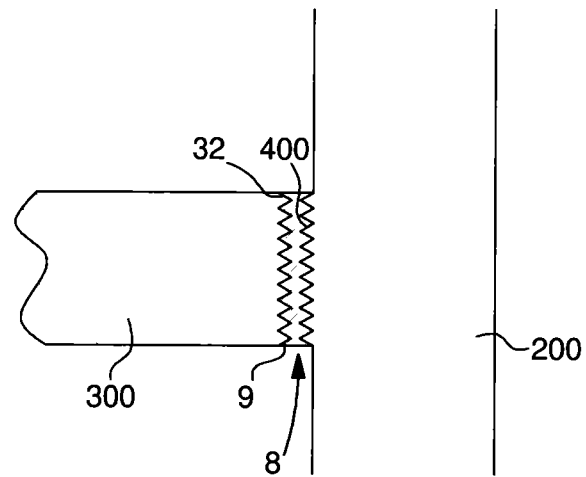
FIGS. 20 to 21 show schematically a variant of the present invention.
Figure 21:
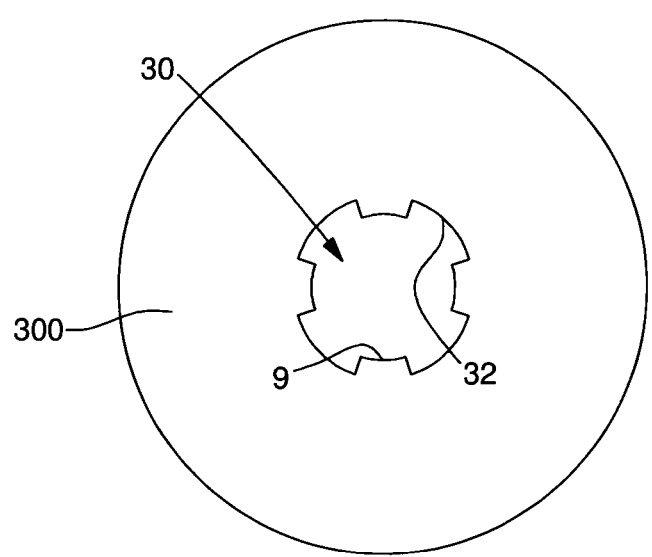

In a second variant, the attachment between the first part 2, 200 and the second part 3, 300, such as for example between wheel 300 and arbour 200, is increased. To achieve this, an adherence means 8 is arranged on the inner edge 32 of the through hole 30 in wheel 300 as seen in FIGS. 20 and 21. However, the first part 2, 200 or the second part 3, 300 may have portions in relief 9. This adherence means, arranged on the interface between the second part and the first part takes the form of portions in relief 9 located on the internal edge of through hole 30 in wheel 300 to improve the join between said parts. These portions in relief 9 take the form of projecting portions or recesses. The improved attachment is due to the association of portions in relief 9 with the features of the amorphous metal, whose viscosity decreases sharply so that it becomes easy to handle when it is heated to a temperature comprised between its vitreous transition temperature and its crystallisation temperature. This allows it to take the exact shape of portions in relief 9 during shaping. These portions in relief 9 thus provide a radial and axial hold so that the wheel 300 secured to arbour 200 can no longer move.

It will be clear that various alterations and/or improvements and/or combinations evident to those skilled in the art may be made to the various embodiments of the invention set out above without departing from the scope of the invention defined by the annexed claims.

It is clear that it is wheel 300 and/or arbour 200 which comprises portions in relief 9.

The invention claimed is:

1. A method of assembling a device comprising a first part and at least one second part, said first part and said at least one second part being arranged to allow assembly to each other, wherein said method comprises:
taking the first part and the at least one second part;
assembling said at least one second part and said first part as provided by the arrangement thereof so that a gap is present between said at least one second part and said first part;
taking a metal alloy, chosen for its ability to become at least partially amorphous; and
shaping said metal alloy so that it fills the gap between said at least one second part and said first part so as to join them and thereby form said device, said metal alloy having been subject to a treatment allowing said alloy to become at least partially amorphous, at the latest at the time of said shaping operation.

2. The method according to claim 1, wherein said metal alloy is subject to a temperature increase above the melting temper're thereof causing said alloy to lose any local crystalline structure, said increase being followed by cooling to a lower temperature than the vitreous transition temperature thereof allowing said metal alloy to become at least partially amorphous.

3. The method according to claim 1, wherein the shaping includes shaping said metal alloy only after having previously transformed said alloy into an at least partially amorphous preform, said preform is then subject to a temperature comprised between the vitreous transition temperature and the crystallisation temperature of said metal alloy and then to a pressure working operation, followed by a cooling operation allowing said metal alloy to preserve an at least partially amorphous nature.

4. The method according to claim 2, wherein the shaping includes shaping said metal alloy only after having previously transformed said alloy into an at least partially amorphous preform, said preform is then subject to a temperature comprised between the vitreous transition temperature and the crystallisation temperature of said metal alloy and then to a pressure working operation, followed by a cooling operation allowing said metal alloy to preserve an at least partially amorphous nature.

5. The method according to claim 1, wherein the shaping is simultaneous with a treatment which makes said metal alloy at least partially amorphous, by subjecting said metal alloy to a temperature higher than the melting temperature thereof followed by cooling at a lower temperature than the vitreous transition temperature thereof, which allows said alloy to become at least partially amorphous, during a casting operation.

6. The method according 2, wherein the shaping is simultaneous with a treatment which makes said metal alloy at least partially amorphous, by subjecting said metal alloy to a temperature higher than the melting temperature thereof followed by cooling at a lower temperature than the vitreous transition temperature thereof, which allows said alloy to become at least partially amorphous, during a casting operation.

7. A method of assembling a device comprising a first part and at least one second part, said first part and said at least one second part being arranged to allow assembly to each other, wherein said method comprises:
taking the first part and the at least one second part;
taking a metal alloy capable of becoming at least partially amorphous;
transforming said metal alloy an as to obtain an at least partially amorphous preform;
placing said preform on said first part;
heating said perform to a temperature comprised between the vitreous transition temperature and the crystallisation temperature of said metal alloy; and assembling said at least one second part and said first part so that said at least one second part exerts pressure on the preform so that said preform fills a gap created between said at least one second part and said first part during said assembling step, and so that said at least one second part and said first part are joined to each other thereby forming said device.

8. The method according to claim 1, further comprising crystallising said metal alloy, including heating said metal alloy to a temperature comprised between the vitreous transition temperature thereof and the melting temperature thereof, followed by cooling to allow the crystalline structuring of said metal alloy.

9. The method according to claim 7, further comprising crystallising said metal alloy, including heating said metal alloy to a temperature comprised between the vitreous transition temperature thereof and the melting temperature thereof, followed by cooling to allow the crystalline structuring of said metal alloy.

10. The method according to claim 1, wherein the first part and/or second part are made of a material which has no usable plastic range.

11. The method according to claim 7, wherein the first part and/or second part are made of a material which has no usable plastic range.

12. The method according to claim 1, wherein said metal alloy is completely amorphous.

13. The method according to claim 7, wherein said metal alloy is completely amorphous.

14. The method according to claim 1, wherein said metal alloy includes at least one precious metal element and is selected from the group consisting of gold, platinum, palladium, rhenium, ruthenium, rhodium, silver, iridium and osmium.

15. The method according to claim 7, wherein said metal alloy includes at least one precious metal element and is selected from the group consisting of gold, platinum, palladium, rhenium, ruthenium, rhodium, silver, iridium and osmium.

16. The method according to claim 1, wherein said first part or said at least one second part includes portions in relief so as to improve the attachment between said first part and said at least one second part.

17. The method according to claim 7, wherein said first part or said at least one second part includes portions in relief so as to improve the attachment between said first part and said at least one second part.

18. The method according to claim 1, wherein said first part and said at least one second part include portions in relief so as to improve the attachment between said first part and said at least one second part.

19. The method according to claim 7, wherein said first part and said at least one second part include portions in relief so as to improve the attachment between said first part and said at least one second part.

20. The method according to claim 1, wherein said first part is a pallet lever and said at least one second part is a pallet stone.

21. The method according to claim 7, wherein said first part is a pallet lever and said at least one second part is a pallet stone.

22. The method according to claim 1, wherein said first part is a wheel and said at least one second part s an arbour.

23. The method according to claim 7, wherein said first part is a wheel and said at least one second part is an arbour.

24. The method according to claim 22, wherein the wheel is made of silicon.

25. The method according to claim 23, wherein the wheel is made of silicon.

26. The method according to claim 22, wherein the wheel is made of ceramic material.

27. The method according to claim 23, wherein the wheel is made of ceramic material.

28. The method according to claim 22, wherein wheel is made of a ceramic-metal composite (cermet).

29. The method according to claim 23, wherein the wheel is made of a ceramic-metal composite (cermet).

* * * * *